US007017713B2

(12) United States Patent
Tai

(10) Patent No.: US 7,017,713 B2
(45) Date of Patent: Mar. 28, 2006

(54) STACKER CRANE

(75) Inventor: Akito Tai, Kagamigahara (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 352 days.

(21) Appl. No.: 10/302,832

(22) Filed: Nov. 25, 2002

(65) Prior Publication Data

US 2003/0098207 A1 May 29, 2003

(30) Foreign Application Priority Data

Nov. 28, 2001 (JP) ............................ 2001-362200
Aug. 27, 2002 (JP) ............................ 2002-246580

(51) Int. Cl.
*B65G 1/04* (2006.01)

(52) U.S. Cl. ...................... 187/244; 187/263; 414/266; 182/120

(58) Field of Classification Search ................ 187/240, 187/244, 263; 414/266–286; 104/121; 182/120, 182/156, 159, 163, 164, 228.3, 228, 115
See application file for complete search history.

(56) References Cited

U.S. PATENT DOCUMENTS 2,847,131 A * 8/1958 Miller ........................ 414/254
4,319,662 A * 3/1982 Liston ........................ 104/121

FOREIGN PATENT DOCUMENTS

| | | | | |
|---|---|---|---|---|
| JP | 03133899 | A | * | 6/1991 |
| JP | 06042279 | A | * | 2/1994 |
| JP | 6-183510 | | | 7/1994 |
| JP | 06183510 | A | * | 7/1994 |
| JP | 07223707 | A | * | 8/1995 |
| JP | 08157011 | A | * | 6/1996 |
| JP | 08324713 | A | * | 12/1996 |
| JP | 10203607 | A | * | 8/1998 |
| JP | 10212004 | A | * | 8/1998 |
| JP | 11322011 | A | * | 11/1999 |

* cited by examiner

*Primary Examiner*—Eileen D. Lillis
*Assistant Examiner*—Thuy V. Tran
(74) *Attorney, Agent, or Firm*—Westerman, Hattori, Daniels & Adrian, LLP

(57) ABSTRACT

A mast in a conventional stacker crane is configured to extend in a vertical direction. Accordingly, the mast is not sufficiently rigid, and may swing in a running direction during running or when the running operation is stopped. An attempt to increase the rigidity results in a thicker mast, thus increasing the size of the stacker crane. In order to solve this problem, a mast is extended vertically from a lower frame and a platform that elevates and lowers along the mast wherein a ladder is extended vertically at a position opposite to the mast across the platform in a direction in which the lower frame runs, and a top of the mast and a top of the ladder is connected together via an upper frame.

4 Claims, 11 Drawing Sheets

STACKER CRANE

FIELD OF THE INVENTION

The present invention relates to the configuration of a stacker crane comprising a mast extended vertically from a lower frame and a platform that elevates and lowers along the mast, the stacker crane automatically running along a running path arranged between a pair of racks.

BACKGROUND OF THE INVENTION

A known automatic warehouse for a clean room comprises a pair of racks and a stacker crane automatically running along a running path arranged between the racks. The stacker crane comprises a mast extended vertically from a lower frame and a platform that can elevate and lower along the mast. The stacker crane also has running means and a loading mechanism.

In this stacker crane, the mast, which supports the platform, is configured to extend in a vertical direction. Accordingly, if the mast has an insufficient rigidity, it may be swung in the running direction during running or when the running operation is stopped. To hinder this swing, the frame structure of the stacker crane including the mast must have an increased rigidity. However, increasing the rigidity requires the thickness of the mast to be increased, thus increasing the size of the stacker crane.

Further, an automatic warehouse provided with a stacker crane uses electric power as a drive source. Accordingly, if trouble such as electric power interruption occurs, the stacker crane cannot be operated until electric conduction is resumed. Thus, even if works in process that must be processed urgently are stocked in the automatic warehouse, the urgent works in process cannot be retrieved until the trouble is settled to allow the stacker crane to be restarted.

It is thus an object of the present invention to provide a stacker crane having a frame structure that has an increased rigidity in spite of its compact configuration, the stacker crane allowing articles stocked in an automatic warehouse to be retrieved even if electric power interruption or a failure occurs.

SUMMARY OF THE INVENTION

To attain this object, the present invention uses the means described below. According to an aspect of the invention, there is provided a stacker crane comprising a mast extended vertically from a lower frame and a platform that elevates and lowers along the mast, wherein a ladder is extended vertically at a position opposite to the mast across the platform in a direction in which the lower frame runs, and a top of the mast and a top of the ladder are connected together via an upper frame.

Further, according to another aspect of the invention, the ladder comprises vertical members and cross bars, and the length of the vertical members in the running direction is formed to be longer than their length in a direction orthogonal to the running direction. Furthermore, the cross bars are arranged on that side of each of the vertical members which is closer to an edge of the lower frame.

Moreover, according to a further aspect of the invention, the ladder comprises vertical members and cross bars, and the cross bars can be freely attached to and removed from the vertical members.

Furthermore, according to another aspect of the invention, the stacker crane further comprises running means having a brake mechanism that can be manually released and an elevating mechanism that allows the platform to be manually elevated and lowered.

DETAILED DESCRIPTION OF THE PREFERRED EMBODIMENTS

Embodiments of the present invention will be described with reference to the accompanying drawings.

First, a brief description will be given of the entire configuration of an automatic warehouse comprising a stacker crane according to the present invention.

Figure 1:
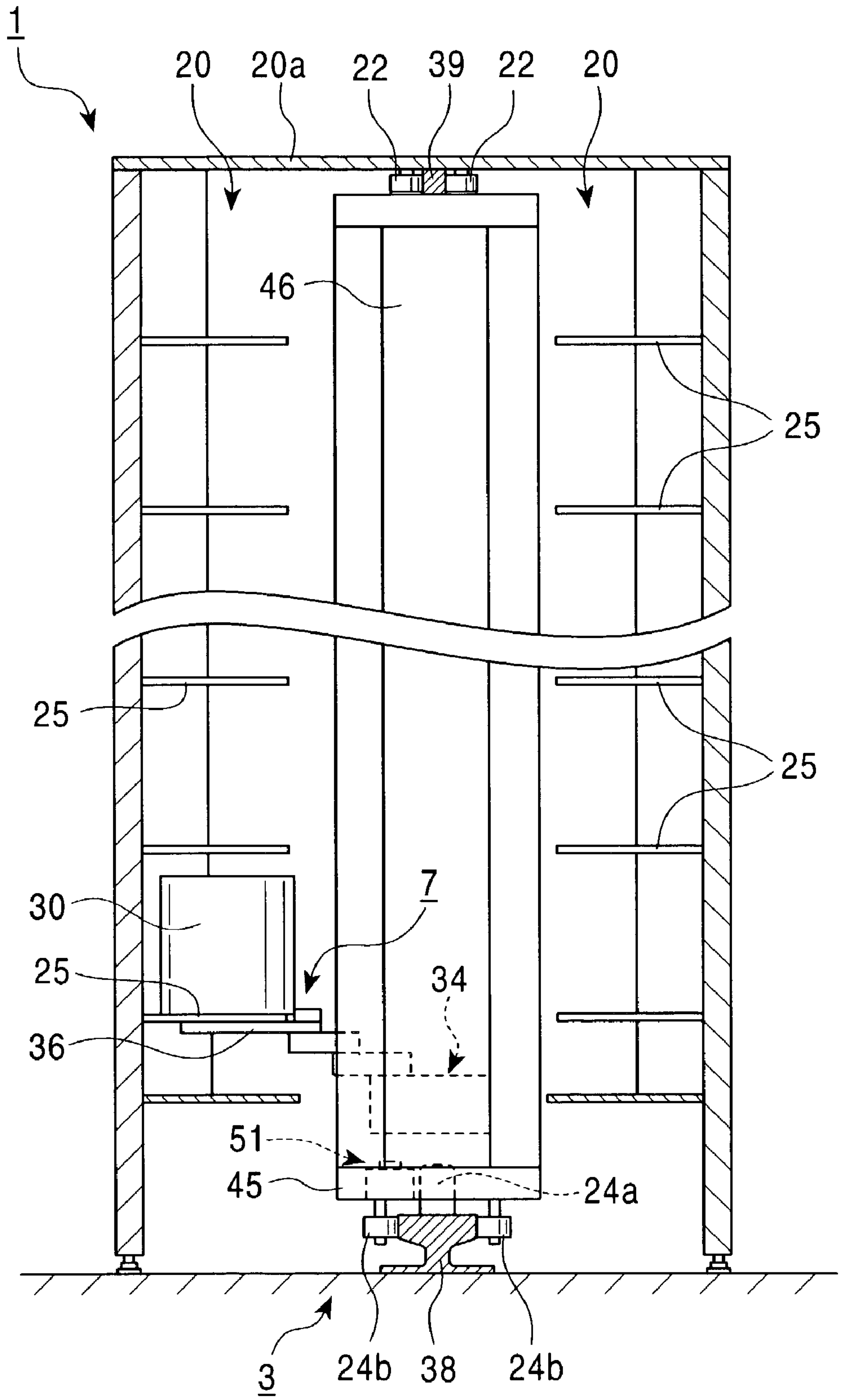
FIG. 1 is a front sectional view showing an automatic warehouse according to the present invention.
Figure 2:
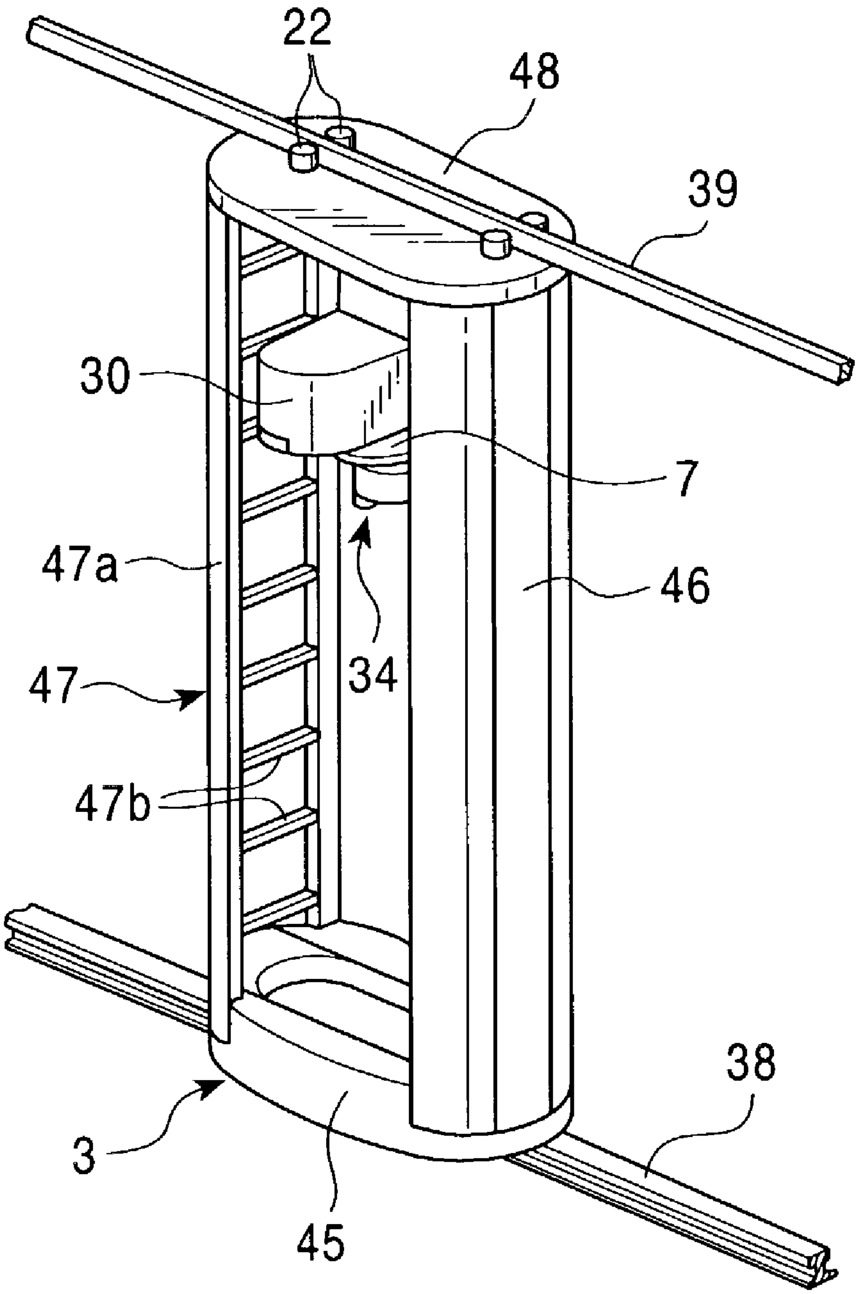
FIG. 2 is a perspective view showing a stacker crane of the automatic warehouse.

An automatic warehouse 1 shown in FIG. 1 comprises a pair of housing sections 20, 20 having a large number of article housing shelves 25 and a stacker crane 3.

The pair of housing sections 20, 20 are arranged opposite each other across a running rail 38 laid on a floor surface. Each of the housing sections 20 comprises the large number of housing shelves 25 arranged in a longitudinal direction (the direction of a running rail 38) and in a vertical direction.

A lower frame 45 is located at the lower end of the stacker crane 3 to act as a carriage, and is provided with a running wheel 24*a* running on the running rail 38 and guide wheels 24*b*, 24*b*. The running wheel 24*a* is driven by a running device 51 installed in the lower frame 45 as a running means. Accordingly, the stacker crane 3 can run along the running rail 38.

Further, the upper end of each of the housing sections 20, 20 is connected to a ceiling surface 20*a*. A guide rail 39 is laid on the ceiling surface 20*a*. Guide rollers 22, 22 are installed on the upper end surface of the stacker crane 3 to guide both sides of the guide rail 39.

The stacker crane 3 comprises a platform 34 that elevates and lowers along a mast 46 and a loading device 7 constructed on the platform 34. The stacker crane 3 is configured to, for example, use the loading device 7 to receive an article 30 such as a cassette through a delivery port (not shown in the drawings) formed in the automatic warehouse 1, the article 30 housing a wafer and being closable, and then to place the article on the platform 34. Then, the platform 34 runs to an empty article housing shelf 25. Subsequently, the loading device 7 is used to place the article on the article housing shelf 25.

The reverse operation is possible. That is, a loading device 7 is used to receive the article 30 already housed on the article housing shelf 25 and then place it on the platform 34. The platform 34 then runs to the delivery port. Subsequently, the loading device 7 is used to transfer the article 30 to the delivery port.

The mast 46 is extended vertically in the front or rear of the lower frame in its running direction. The platform 34 is attached to the mast 46 so as to be elevatingly driven. The loading device 7 is installed on the platform 34 to load the article 30.

On the other hand, a ladder 47 is extended vertically in the rear or front of the lower frame 45, and is substantially as high as the mast 46. The upper ends of the ladder 47 and the mast 46 are connected together by an upper frame 48 as a connecting surface for the ladder 47 and the mast 46.

By thus connecting the upper end of the ladder 47, installed opposite the mast 46, and the upper end of the mast 46 together, the mast 46 can be reinforced to improve the rigidity of the stacker crane 3.

In this case, the stacker crane 3 uses electric power as a drive source for the running device 51 of the lower frame 45 and the platform 34. However, in a clean room in a semiconductor fabrication plat or the like, a non-contact feeding system that feeds electricity to feeder lines in a non-contact manner is employed to perfectly prevent dust.

In this non-contact feeding system, a primary circuit with a power supply feeds electricity to a secondary circuit with a power load in a non-contact manner, utilizing electromagnetic induction. That is, the housing section 20 is provided with a feeder line constituting the primary circuit, while the lower frame 45 of the stacker crane 3 or the like is provided with a receiving device constituting the secondary circuit. The lower frame 45 obtains, through the receiving device, electric power from a magnetic field generated in the feeder line, to drive an electric motor 52 for the running device 51 and an electric motor 61 for the platform 34.

In this embodiment, the non-contact feeding system is used to feed electricity to the stacker crane in order to minimize the occurrence of dust. However, the present invention is not limited to the non-contact feeding system. Since closable cassettes are used, the feeding system may use, for example, a trolley or a cable housed in a flexible cable protective member.

In the automatic warehouse 1, if trouble such as electric power interruption occurs to preclude a power supply to the stacker crane 3, the stacker crane 3 cannot run or the platform 34 cannot be elevatingly driven. Further, if the stacker crane 3 fails electrically, it is repaired at a maintenance location outside the automatic warehouse 1 and is then returned to the inside of the automatic warehouse 1 for reactivation. Accordingly, even if works in process that must be urgently processed are stocked in the automatic warehouse 1, they cannot be retrieved until the trouble is settled to allow the stacker crane to be restarted.

Thus, the automatic warehouse 1 according to the present invention is configured as described below to solve this problem.

Figure 3:
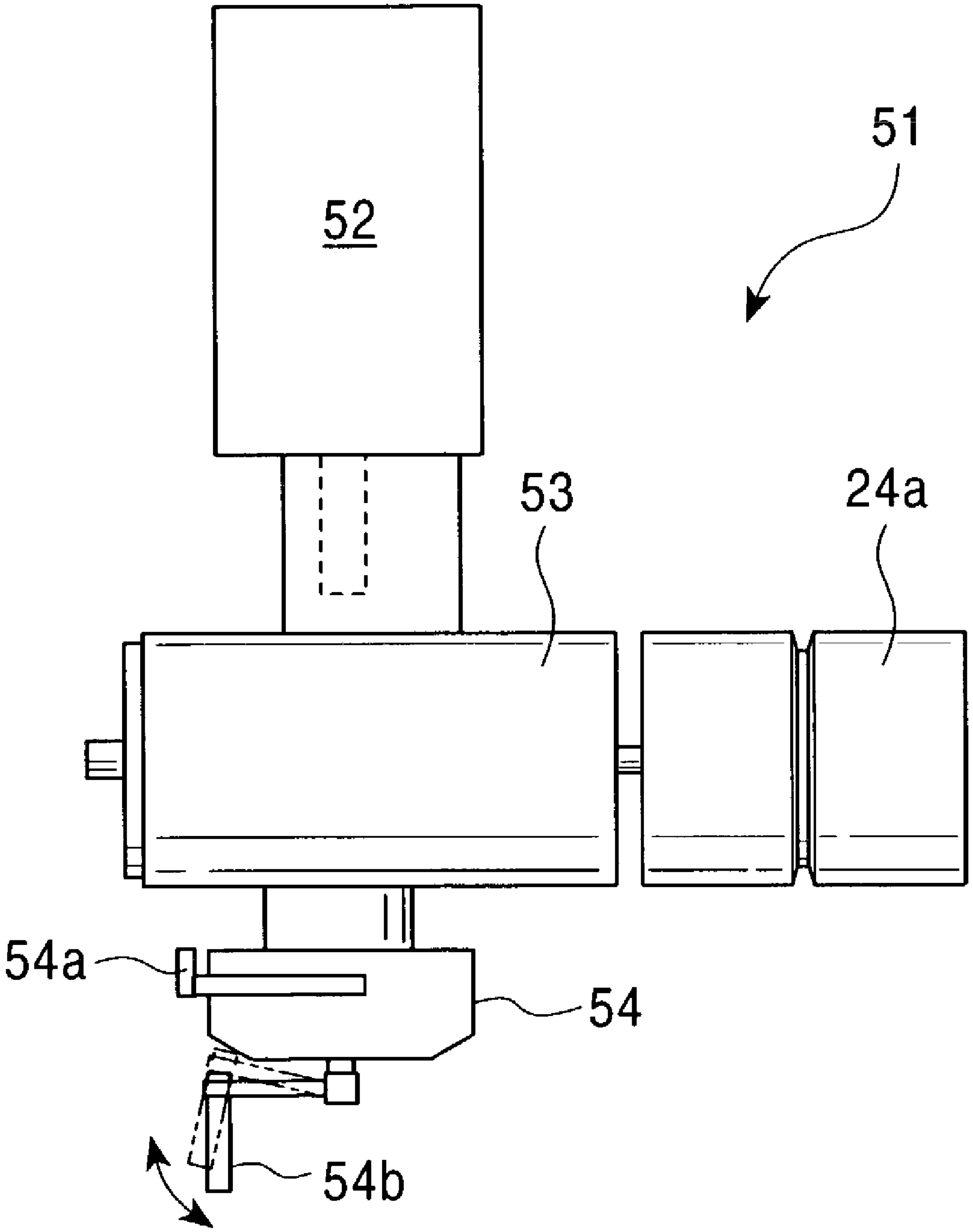
FIG. 3 is a plan view showing a running device.

First, the running device 51 of the lower frame 45 will be described. As shown in FIG. 3, the running device 51 is provided with the electric motor 52 that rotationally drives the running wheel 24*a,* a speed reducer 53 that decelerates the rotation of the electric motor 52 to transmit the decelerated rotation to the running wheel 24*a,* and a brake device 54 that brakes the running wheel 24*a* to reliably stop the stacker crane 3. The brake device 54 is configured to limit the rotation of output shaft of the electric motor 52 to brake the running wheel 24*a*.

Further, the brake device 54 is composed of, for example, an electromagnetic brake so as to be released by electric power. Accordingly, if a power supply to the stacker crane 3 is interrupted, the brake remains applied to preclude the stacker crane 3 from being moved.

However, the brake device 54 is provided with a brake releasing lever 54*a* that allows a braked state to be manually released. Even if the stacker crane 3 is not supplied with electric power, the brake releasing lever 54*a* allows the braked state of the brake device 54 to be manually released, thus enabling the running wheel 24*a* to rotate freely.

Furthermore, the brake device 54 is provided with a manual handle 54*b* that can be rotationally operated to rotationally drive the running wheel 24*a*. That is, when raised (the position shown by the solid line in FIG. 3), the manual handle 54*b* can be engaged with an input shaft of the brake device 54 and rotated integrally with the input shaft. When bent (the position shown by the alternate long and two short dashes line in FIG. 3), the manual handle 54*b* is not engaged with the output shaft of the electric motor 52 but is free.

By using the brake releasing lever 54*a* to release the braked state, then raising the bent manual handle 54, and rotationally operating the raised manual handle 54, the running wheel 24*a* can be driven to allow the stacker crane 3 to be manually moved to the front of the desired article housing shelf 25.

Figure 4:
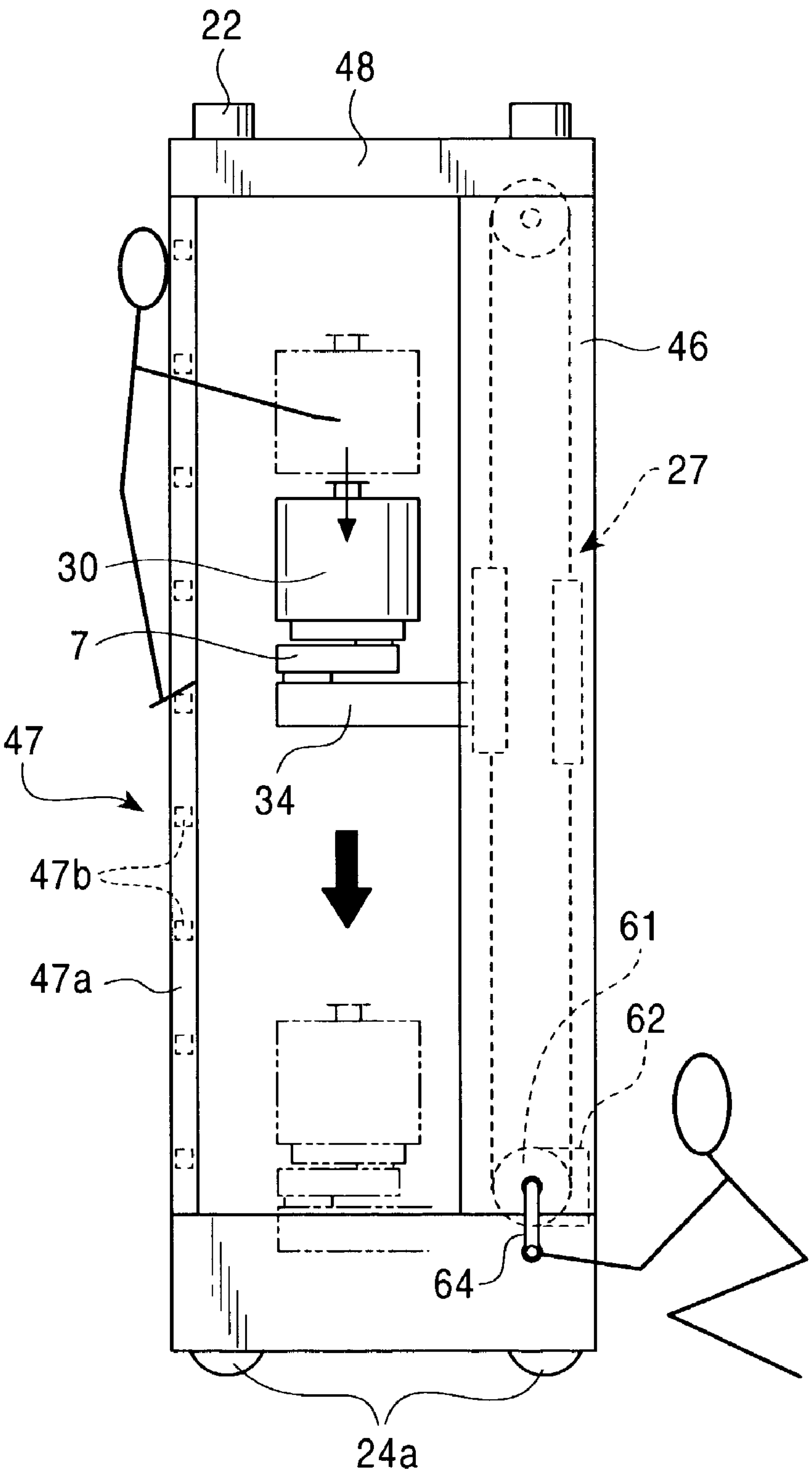
FIG. 4 is a diagram showing how the stacker crane is manually operated to retrieve articles.

Now, the platform 34 will be described. As shown in FIG. 4, an elevating mechanism 27 of the platform 34 is disposed in the mast 46 of the stacker crane 3. An electric motor 61 with a speed reducer 62 is mounted on the elevating mechanism 27. Rotational driving force of the electric motor 61 is reduced by the speed reducer 62. The reduced force is then transmitted to the elevating mechanism 27 to elevatingly drive the platform 34.

Figure 5:
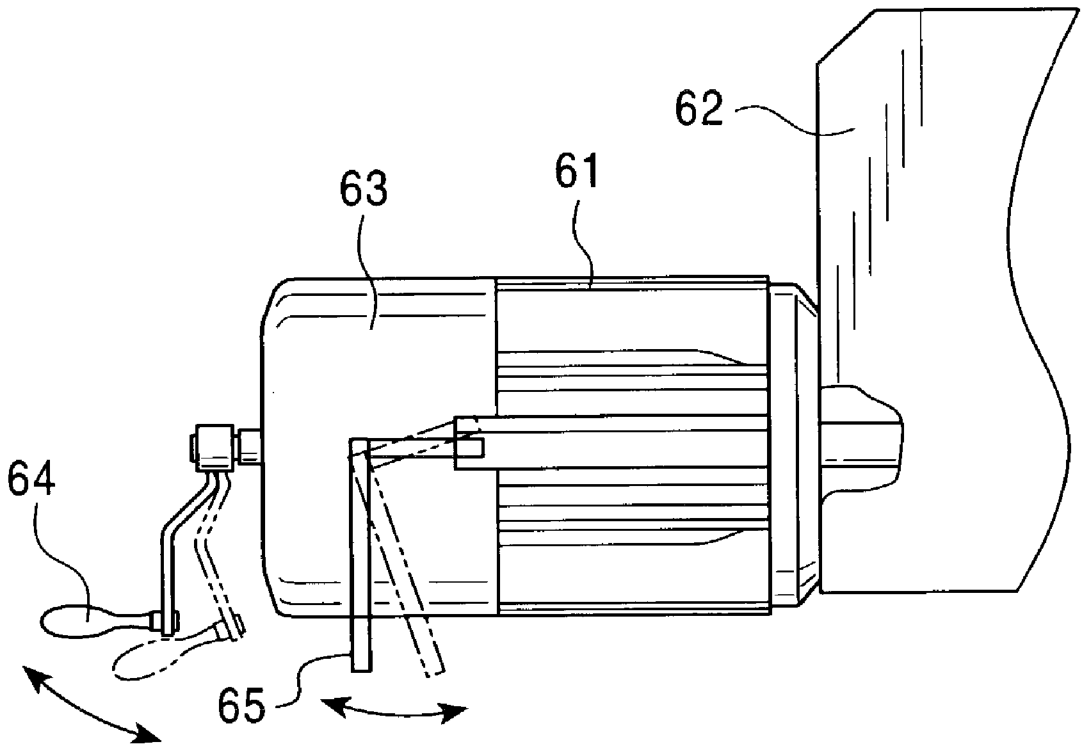
FIG. 5 is a side view showing an electric motor and a brake device for an elevating mechanism.

As shown in FIG. 5, the electric motor 61 is provided with a brake device 63 that brakes the electric motor 61. Accordingly, the electric motor 61 can be braked. The brake device 63 is configured to limit the rotation of output shaft of the electric motor 61 to reliably stop the platform 34 at a precise position.

Further, the brake device 63 is provided with a brake releasing lever 65 that allows the braked state to be manually released. Even if the stacker crane 3 is not supplied with electric power, the brake releasing lever 65 can be manually tilted to release the braked state of the brake device 54, constructed as a brake or the like, thus enabling the output shaft of the electric motor 61 to rotate freely. In this embodiment, for example, when the brake releasing lever 65 is manually operated from its normal position (the position shown by the solid line in FIG. 5) to its tilted position (the position shown by the alternate long and two short dashes line in FIG. 5), the braked state is released.

Furthermore, the brake device 63 is provided with a manual handle 64 that can be rotationally operated to rotationally drive the platform 34 via the freely rotatable electric motor 61. That is, when raised (the position shown by the solid line in FIG. 5), the manual handle 64 can be engaged with the output shaft of the electric motor 61 and rotated integrally with the output shaft. When bent (the position shown by the alternate long and two short dashes line in FIG. 5), the manual handle 64 is not engaged with the output shaft of the electric motor 52 but is free.

By using the brake releasing lever 65 to release the braked state, then raising the bent manual handle 64, and rotationally operating the raised manual handle 64, the elevating mechanism 27 can be driven to allow the platform 34 to elevate to a desired height.

Thus, the stacker crane 3 is configured to allow the braked state of the brake device 63 to be manually released and to allow the platform 34 to be manually elevated and lowered. Therefore, even if trouble such as electric power interruption, which precludes a power supply, or an electric failure occurs, the article 30 stocked in the automatic warehouse 1 can be retrieved.

That is, if trouble occurs in the stacker crane 3, which is thus stopped, two operators can retrieve the article 30 stocked in the automatic warehouse 1.

First, with the stacker crane 3 remaining stopped, one of the operators manually releases the braked state of the brake device 54 of the running device 51. The operator also manually rotationally operates the manual handle 54*b* to move the stacker crane 3 to the front of housing section 20 in which the article 30 to be retrieved is housed.

Once the stacker crane 3 is moved to the desired position, the above operator uses the brake releasing lever 65 of the brake device 63 installed in the electric motor 61. The operator also manually operates the manual handle 64 to elevate the platform 34 to the height of the desired shelf in the housing section 20. During this operation, the other operator climbs up the ladder 47 to a predetermined height.

The other operator, who has climbed up the ladder 47, retrieves the desired article 30 from the shelf in the housing section 20, and places it on the loading device 7 of the platform 34. The first operator manually operates the manual handle 64 to lower the platform 34, on which the article 30 is placed.

The other operator climbs down the ladder 47 and unloads the article 30 from the lowered platform 34.

Figure 6:
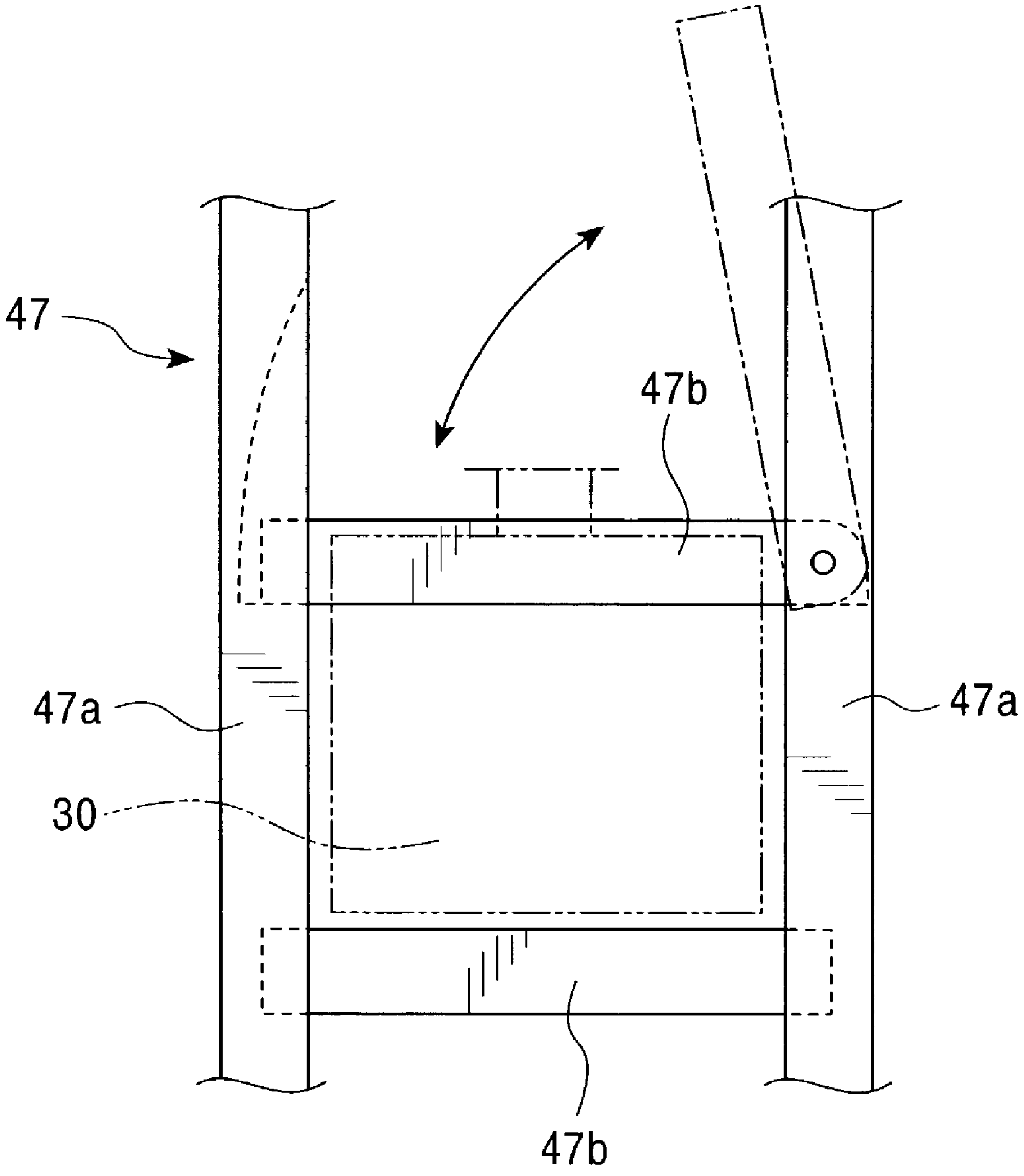
FIG. 6 is a diagram showing cross bars of a ladder of the stacker crane which cross bars can be pivoted in a vertical direction.

In this case, a cross bar 47*b* located in the lower part of the ladder 47 is configured to be pivoted vertically around one end of the cross bar 47*b* as shown in FIG. 6. Then, when the operator climbs down the ladder 47, the cross bar 47*b* is rotationally moved downward to assume a horizontal position so that the operator can use it as a foothold. To remove the article 30 from the platform 34, the cross bar 47*b* is rotationally moved upward to form a space between vertical members 47*a* and 47*a* of the ladder 47 through which the article 30 can be passed. Then, the article 30 placed on the platform 34 is unloaded through the space formed between the vertical members 47*a* and 47*a*.

By thus configuring the cross bar 47*b* so as to be pivoted vertically, a space can be formed in the ladder 47 such that the article 30 can be passed through it. Consequently, the article 30 can be unloaded easily.

By performing the reverse operation compared to the retrieval of the article 30 from the housing section 20, the article 30 can be manually housed on the desired shelf in the housing section 20.

Thus, the running device 51 is provided with the brake device 54, which allows the braked stated to be released, and the mast 46 is provided with the elevating mechanism 27, which allows the platform 34 to be manually elevated and lowered. Further, the stacker crane 3 is provided with the ladder 47. Then, even if electric trouble occurs in the stacker crane 3, the article 30 housed in the housing section 20 can be manually retrieved easily. In particular, once the operator places the article 30 on the platform 34 elevated up to the desired height, the platform 34 can be lowered by the elevating mechanism 27. Consequently, the operator need not climb down the ladder from a high place with the heavy article 30 in his or her hand. Therefore, the article 30 can be manually retrieved safely and reliably.

If the automatic warehouse 1 is provided with a storage and retrieval station for operators, the stacker station 3 may be moved to the receiving and delivering station, where the operator retrieves the article 30 from the platform 34.

Preferably, the brake device, notably the one attached to the electric motor for elevation is not perfectly but partly released (that is, the brake is slightly applied) depending on the reduction ratio of the speed reducer attached to the electric motor.

Further, with this brake device, it is possible to use the releasing lever to adjust the degree to which the brake is applied rather than using the releasing lever to release the brake to a predetermined degree.

Now, a second embodiment of the stacker crane will be described.

Figure 7:
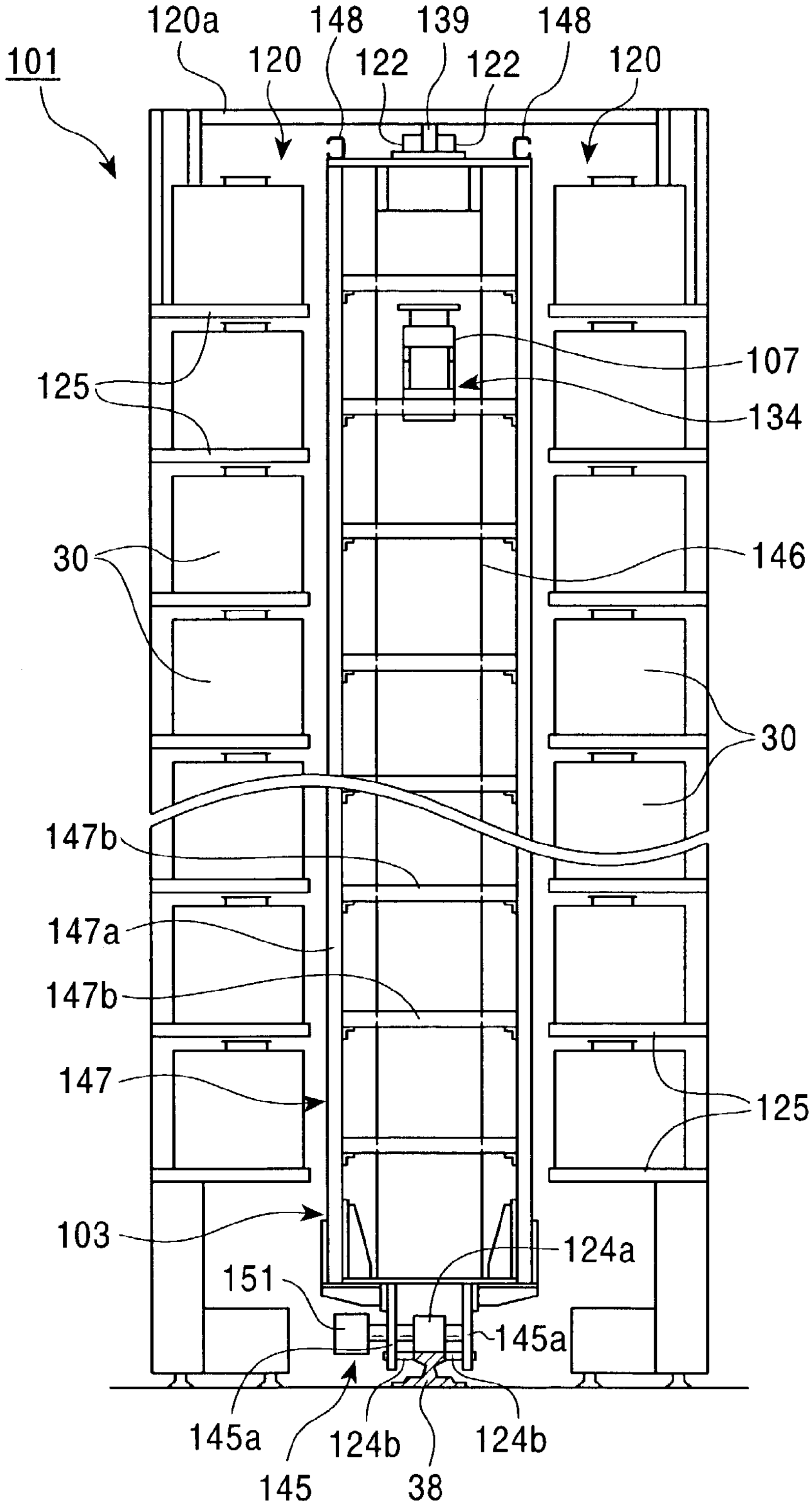
FIG. 7 is a front view showing an automatic warehouse comprising a stacker crane according to a second embodiment.
Figure 8:
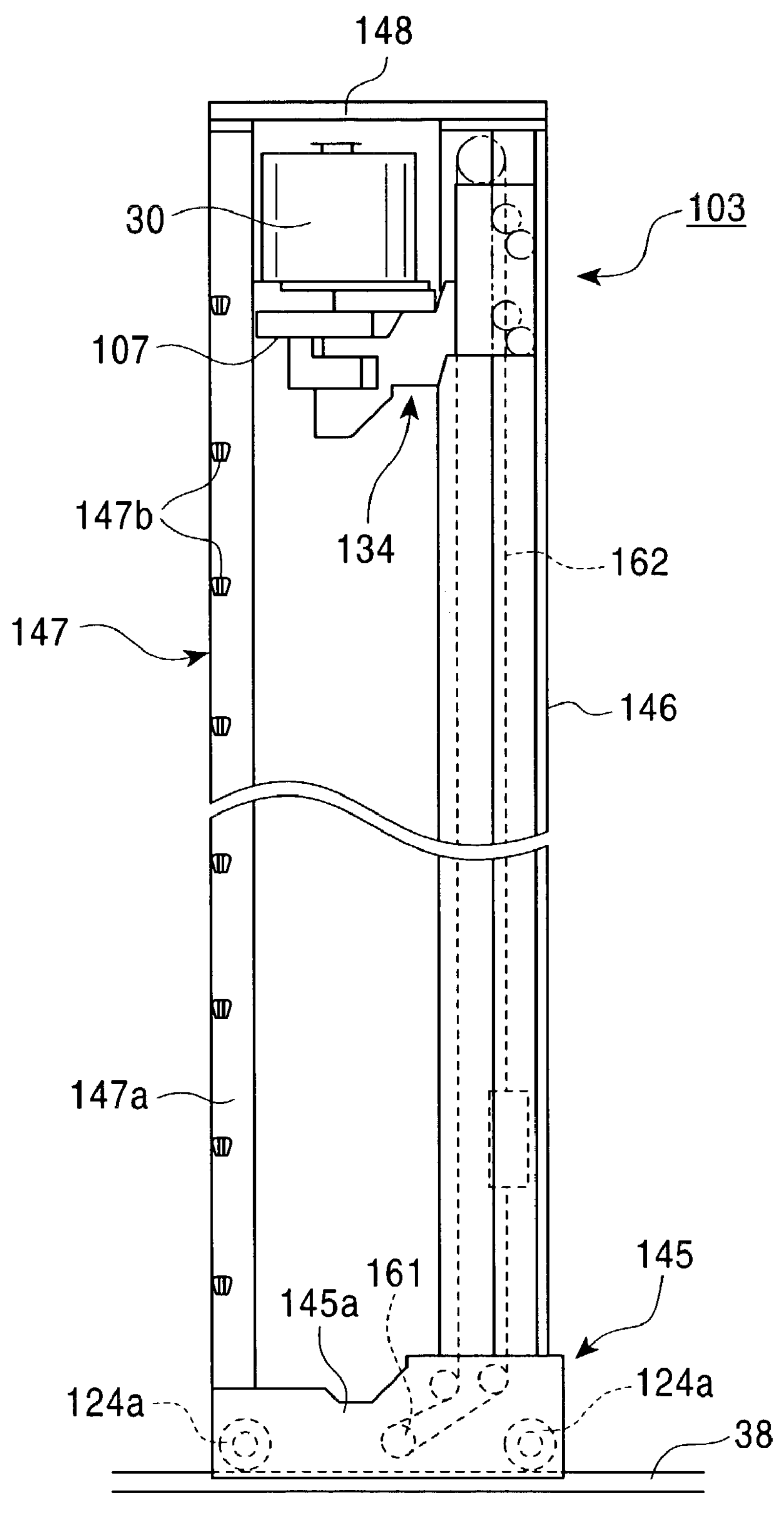
FIG. 8 is a side view showing the stacker crane according to the second embodiment.
Figure 9:
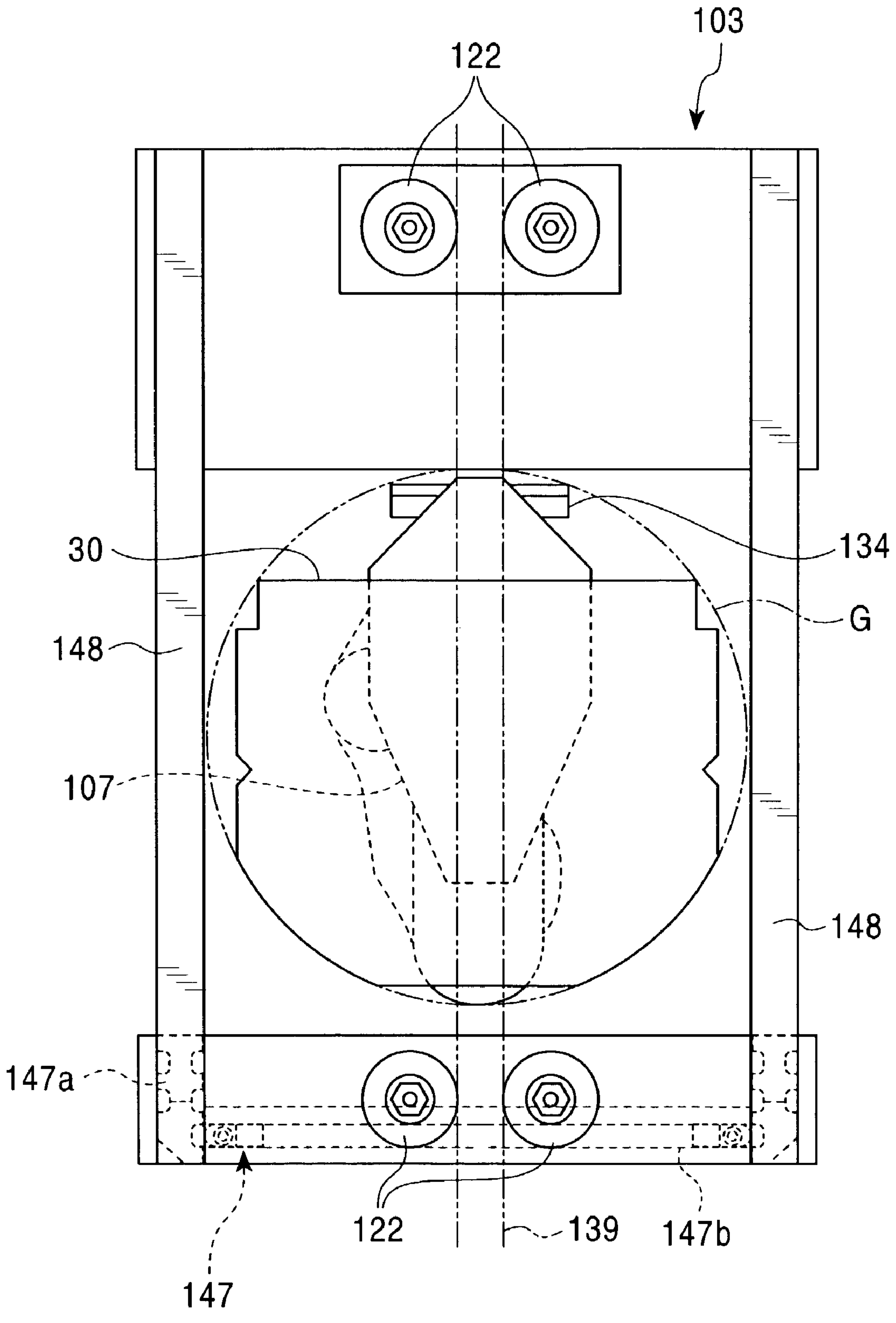
FIG. 9 is a plan view of the stacker crane according to the second embodiment.

As shown in FIG. 7 to FIG. 9, an automatic warehouse 101 provided with a stacker crane 103 comprises a pair of housing sections 120, 120 having a large number of article housing shelves 125 and arranged opposite each other across the running rail 38. Each of the housing sections 120 comprises the large number of housing shelves 125 arranged in the longitudinal direction (the direction of the running rail 38) and in the vertical direction.

A lower frame 145 is located at the lower end of the stacker crane 103, and is composed of a pair of plate frames 145*a*, 145*a* arranged opposite each other. Running wheels 124*a*, 124*a* are supported between the plate frames 145*a* and 145*a*.

The running wheels 124*a*, 124*a* are rotationally driven by a running motor 151 to enable the stacker crane 103 to run along the running rail 38. Further, the lower frame 145 is provided with a pair of guide wheels 124*b*, 124*b* that sandwich the running rail 38 between themselves.

The upper ends of the housing sections 120, 120 are connected together by a beam 120*a*. A guide rail 139 is laid on the beam 120*a*. Guide rollers 122, 122 are installed on the upper end surface of the stacker crane 103 to guide both sides of the guide rail 139.

The stacker crane 103 comprises a mast 146 extended vertically from a lower frame 145 and a platform 134 that elevates and lowers along the mast 146. The stacker crane 103 runs along the running rail 38, and uses a platform 134 to elevate and lower a loading device 107 to transfer the article 30 between a delivery port (not shown in the drawings) formed in the automatic warehouse 101 and the article housing shelf 125.

The mast 146 is extended vertically at one end of the lower frame 145 in its running direction. The platform 134 is elevated and lowered via an elevating belt 162 by an elevating motor 161 installed in the lower frame 145. The platform 134, elevatingly attached to the mast 146, is arranged in the center of the lower frame 145 in its running direction. A ladder 147 is extended vertically at the other end of the lower frame 145 in its running direction, i.e. opposite the mast 146 across the platform 134.

The ladder 147 is formed to be substantially as high as the mast 146. The upper ends of the ladder 147 and the mast 146 are connected together by an upper frame 148.

By thus installing the ladder 147 opposite the mast 146 across the platform 134 and connecting the upper ends of the ladder 147 and the mast 146 together by the upper frame 148, it is possible to increase the rigidity of frame structure of the stacker crane 103, composed of the lower frame 145, the mast 146, and others, to prevent the frame structure from swinging in the running direction. This allows the mast 146 to be formed to be generally thinner to make the stacker crane 103 more compact.

Now, the ladder 147 will be described.

The ladder 147 is composed of a pair of vertical members 147*a* extended vertically from the lower frame 145 and a plurality of cross bars 147*b* extended between the pair of vertical members 147*a*.

Figure 10:
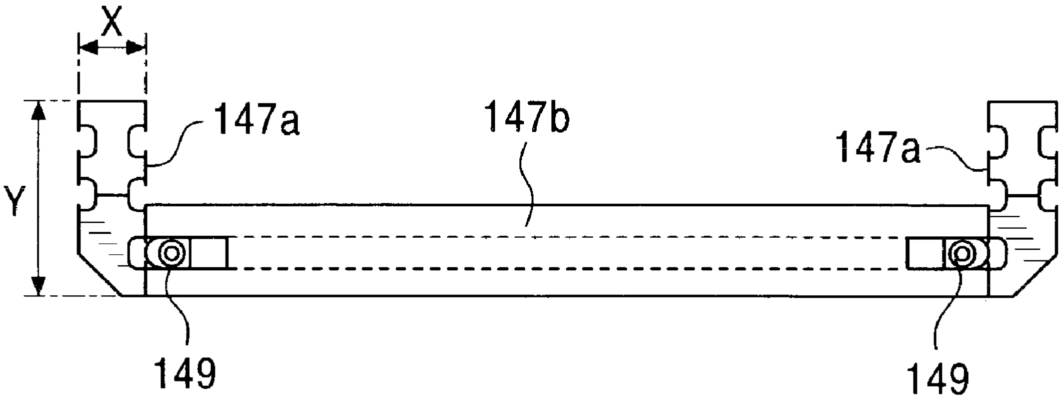
FIG. 10 is a plan view showing a ladder of the stacker crane according to the second embodiment.
Figure 11:
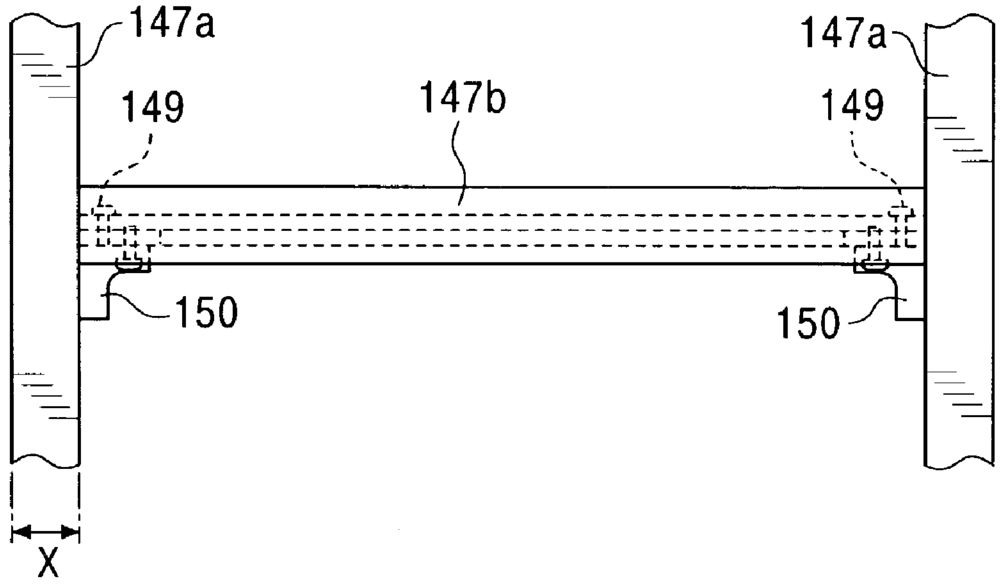
FIG. 11 is a partial front view showing the ladder of the stacker crane according to the second embodiment.
Figure 12:
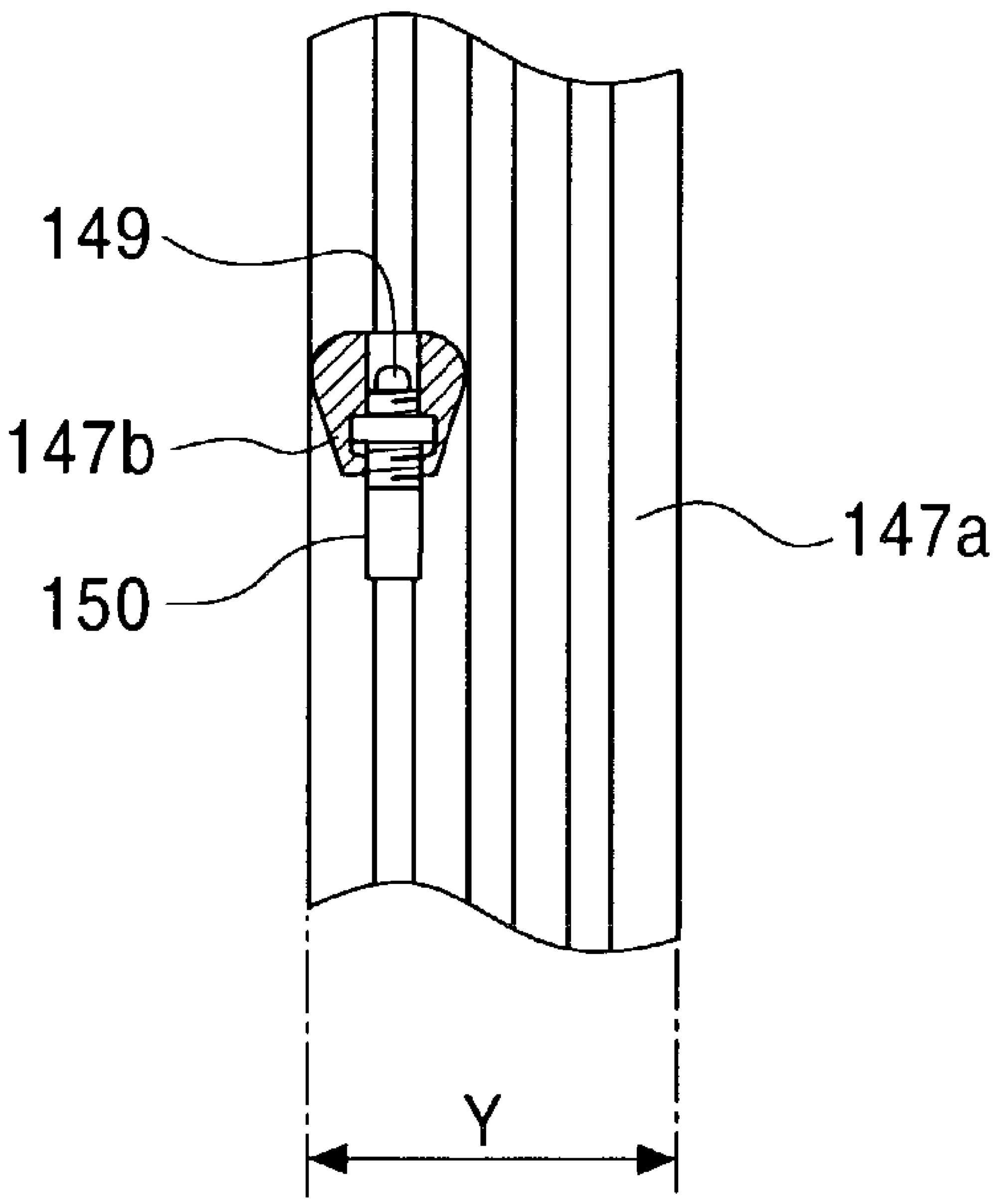
FIG. 12 is a partial side sectional view showing the ladder of the stacker crane according to the second embodiment.

As shown in FIG. 10 to FIG. 12, a support piece 150 is fixedly installed on each of the vertical members 147*a*, 147*a*. The cross bar 147*b* has both ends engaged with the respective support pieces 150, 150 and is fixedly attached to the vertical members 147*a*, 147*a* by using clamping members 149 such as bolts to clamp it on the vertical members 147*a*, 147*a*.

The cross bar 147*b* can be removed from the vertical members 147*a*, 147*a* by releasing the clamping members 149, which clamp it on the support pieces 150, 150. That is, each of the cross bars 147*b* is removably attached to the vertical members 147*a*, 147*a*.

With this configuration, by removing the cross bar 147*b* as required, a space can be formed in the ladder 147 such that the article 30 can be passed through it, as in the case with the previously described ladder 47, in which the cross bar 47*b* can be pivoted vertically. Accordingly, during electric power interruption or the like, the article 30 can be manually loaded or unloaded easily.

Further, the vertical member 147*a* has a length Y in the running direction which is longer than a length X in a direction orthogonal to the running direction. This efficiently increases the rigidity of frame structure of the stacker crane in the running direction to prevent the frame structure from swinging in the running direction.

Furthermore, the cross bar 147*b* is arranged on a side of each vertical member 147*a* which is closer to an edge of the lower frame 145, the vertical member 147*a* being formed to extend in the running direction. By thus arranging the cross bars 147*b*, a larger space is formed between the mast 146 and the cross bars 147*b*. Thus, even if the ladder 147 is arranged closer to the platform 134, a pivoting range G (see FIG. 9) within which the article 30 is pivoted on the platform 134 can be provided between the mast 146 and the ladder 147. Consequently, the stacker crane 103 can be formed to be compact.

The present invention is configured as described above and thus produces the effects described below. The present invention provides a stacker crane comprising a mast extended vertically from a lower frame and a platform that elevates and lowers along the mast, wherein a ladder is extended vertically at a position opposite to the mast across the platform in a direction in which the lower frame runs, and a top of the mast and a top of the ladder are connected together via an upper frame.

Further, the use of the ladder enables operations at high places.

Further, the ladder comprises vertical members and cross bars, and the length of the vertical members in the running direction is longer than their length in a direction orthogonal to the running direction. Furthermore, the cross bars are arranged on that side of each of the vertical members which is closer to an edge of the lower frame.

This efficiently increases the rigidity of frame structure of the stacker crane in the running direction to prevent the frame structure from swinging in the running direction.

Further, a larger space can be formed between the mast and the cross bars of the ladder. Thus, even if the ladder is arranged closer to the platform, a pivoting range within which the article is pivoted on the platform can be provided between the mast and the ladder. Consequently, the stacker crane can be formed to be compact.

Moreover, the ladder comprises vertical members and cross bars, and the cross bars can be freely attached to and removed from the vertical members.

Consequently, by removing the cross bar as required, a space can be formed in the ladder such that the article can be passed through it. Accordingly, during electric power interruption or the like, the article can be manually loaded or unloaded easily.

Furthermore, the stacker crane further comprises running means having a brake mechanism that can be manually released and an elevating mechanism that allows the platform to be manually elevated and lowered.

Accordingly, even if the stacker crane undergoes electric trouble such as electric power interruption or a failure in an electric system, the article housed in the housing section can be manually retrieved easily. In particular, once the operator places the article on the platform manually elevated up to the desired height, the platform can be manually lowered using the elevating mechanism. Consequently, the operator need not climb down the ladder from a high place with the heavy article in his or her hand. Therefore, the article can be manually retrieved safely and reliably.

The invention claimed is:

1. A stacker crane comprising:

a mast extended vertically from a lower frame, a platform that elevates and lowers along the mast, and a ladder comprising vertical members and cross bars, which is extended vertically at a position opposite to the mast across the platform in a direction in which the lower frame runs, wherein each of a top of the mast and tops of the vertical members of the ladder are directly connected to opposite ends of an upper frame.

2. A stacker crane comprising:

a mast extended vertically from a lower frame, a platform that elevates and lowers along the mast, and a ladder comprising vertical members and cross bars, which is extended vertically at a position opposite to the mast across the platform in a direction in which the lower frame runs, wherein each of a top of the mast and tops of the vertical members of the ladder are directly connected to opposite ends of an upper frame, wherein the length of the vertical members in the running direction is formed to be longer than their length in a direction orthogonal to the running direction, and the cross bars are arranged on that side of each of the vertical members which is closer to an edge of the lower frame.

3. A stacker crane comprising:

a mast extended vertically from a lower frame, a platform that elevates and lowers along the mast, and a ladder comprising vertical members and cross bars, which is extended vertically at a position opposite to the mast across the platform in a direction in which the lower frame runs, wherein each of a top of the mast and tops of the vertical members of the ladder are directly connected to opposite ends of an upper frame, wherein the cross bars can be freely attached to and removed from the vertical members.

4. A stacker crane according to claim 3, characterized by further comprising a running means having a brake mechanism that can be manually released and an elevating mechanism that allows the platform to be manually elevated and lowered.

* * * * *